Patented July 14, 1931

1,814,292

UNITED STATES PATENT OFFICE

MARTIN B. CHITTICK, OF CHICAGO, ILLINOIS, ASSIGNOR TO THE PURE OIL COMPANY, OF CHICAGO, ILLINOIS, A CORPORATION OF OHIO

CONCRETE WATERPROOFING COMPOUND

No Drawing.   Application filed April 19, 1930.   Serial No. 445,833.

This invention relates to a novel waterproofing compound for concrete and other analogous cementitious bodies of matter. A principal object of the invention resides in the provision of such a compound, consisting basically of a metallic soap in a mineral oil, which is adapted to be made into an emulsion with the water employed to mix the cement or concrete, whereby in practice the soap compound will be distributed uniformly in the pores of the cement or concrete to thoroughly seal the said pores against water penetration or absorption.

It is generally recognized that the ability of plain concrete to resist water penetration comes only with time and with the development of sufficient colloidal matter therein to fill the pores. Concrete which becomes dry within a few days after it is made does not possess sufficient development of the colloid to prevent the absorption of water. Soaps, however, are as effective in fresh concrete as in that which has aged and materially assist in preventing the penetration of water even when the latter is under pressure.

It is an outstanding object of the present invention to provide an improved soap-containing oleaginous compound which is formed into an emulsion with the water employed in mixing the concrete so that in a finely dispersed state the compound will be uniformly positioned in the pores of the concrete or other similar body when the latter hardens or sets, so that its pores are sealed effectively against the entrance of water. Also, the quality of the concrete will be improved by the use of the compound which serves to retard the rate of curing.

In accordance with the present invention, I use a solution of metallic soap in mineral oil. The mineral solution is made into a soluble oil using ammonia, potassium, sodium salts and sulphonated oils, either singly or in various combinations. These materials are then made into an emulsion with water which is used to mix the cement or concrete.

Although the invention is not so limited in its practical application, a specific example may consist of a solution of 2% by weight of aluminum stearate in 98% by weight of 100 viscosity pale paraffin oil. I then use this solution to make a mixture composed of 90% of the last named materials and 10% of an emulsifier base consisting of a sulphonated vegetable oil and an ammonium soap, and this constitutes the commercial product or compound. In mixing concrete, approximately 25% of the compound is mixed with 75% of water, forming an emulsion, and this constitutes the water employed in the concrete or cement mixture.

The compound thus described possesses a high water-proofing value and is convenient to incorporate in a concrete mix or body. Moreover, it definitely retains its position in the pores of the concrete to guard against water ingress, and the compound does not tend to leach out from the concrete after a certain period of use, and in this respect the compound is a marked improvement over petroleum residues wheretofore employed in the water-proofing of concrete.

What is claimed is:

1. A composition comprising a small percentage of metallic soap combined in solution in a much larger percentage of mineral oil, and an emulsifying agent containing a sulphonated oil in such relative proportions as to form when mixed with water a waterproofing compound for concrete and cement.

2. A composition comprising a small quantity of aluminum stearate contained in solution in a larger quantity of mineral oil, and an emulsifying agent consisting of a sulphonated vegetable oil and an ammonium soap in such relative proportions as to form when mixed with water a waterproofing compound for concrete and cement.

3. A compound for water-proofing concrete and cement comprising a solution consisting of 2% by weight of aluminum stearate in 98% by weight of 100 viscosity pale paraffin oil, and an emulsifying agent added to such solution in the ratio of 90% of said solution and 10% of said agent, the latter consisting of a sulphonated vegetable oil and an ammonium soap.

In testimony whereof I affix my signature.

MARTIN B. CHITTICK.